Sept. 17, 1963 S. A. DOVE 3,103,963
SHAFT STRAIGHTENING DEVICE
Filed July 29, 1960 2 Sheets-Sheet 2
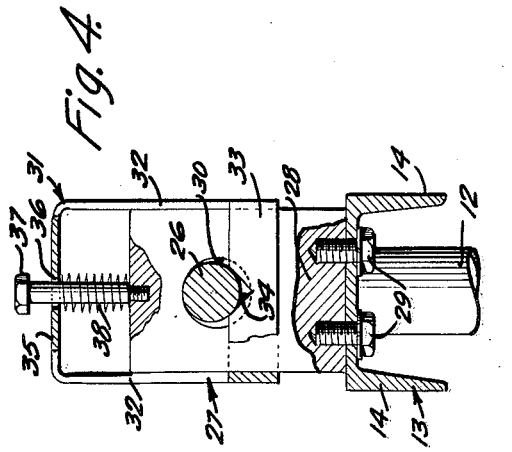
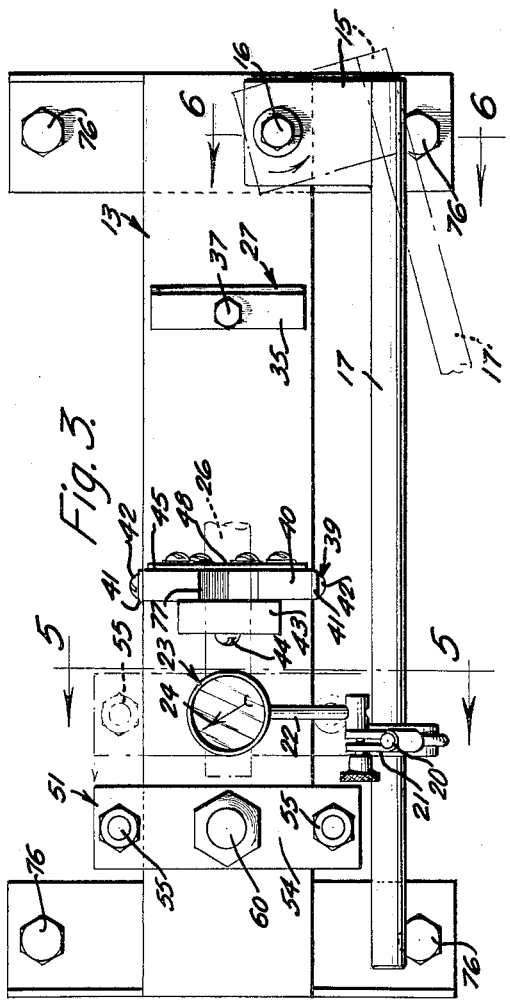
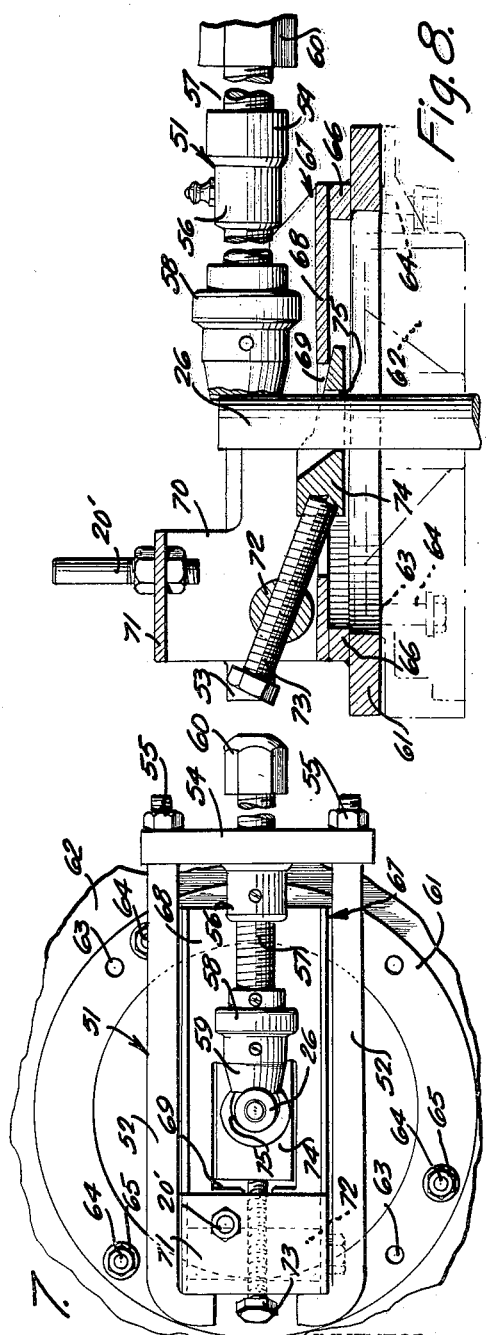
INVENTOR.
Starr A. Dove
BY
Victor J. Evans & Co.
Attorneys

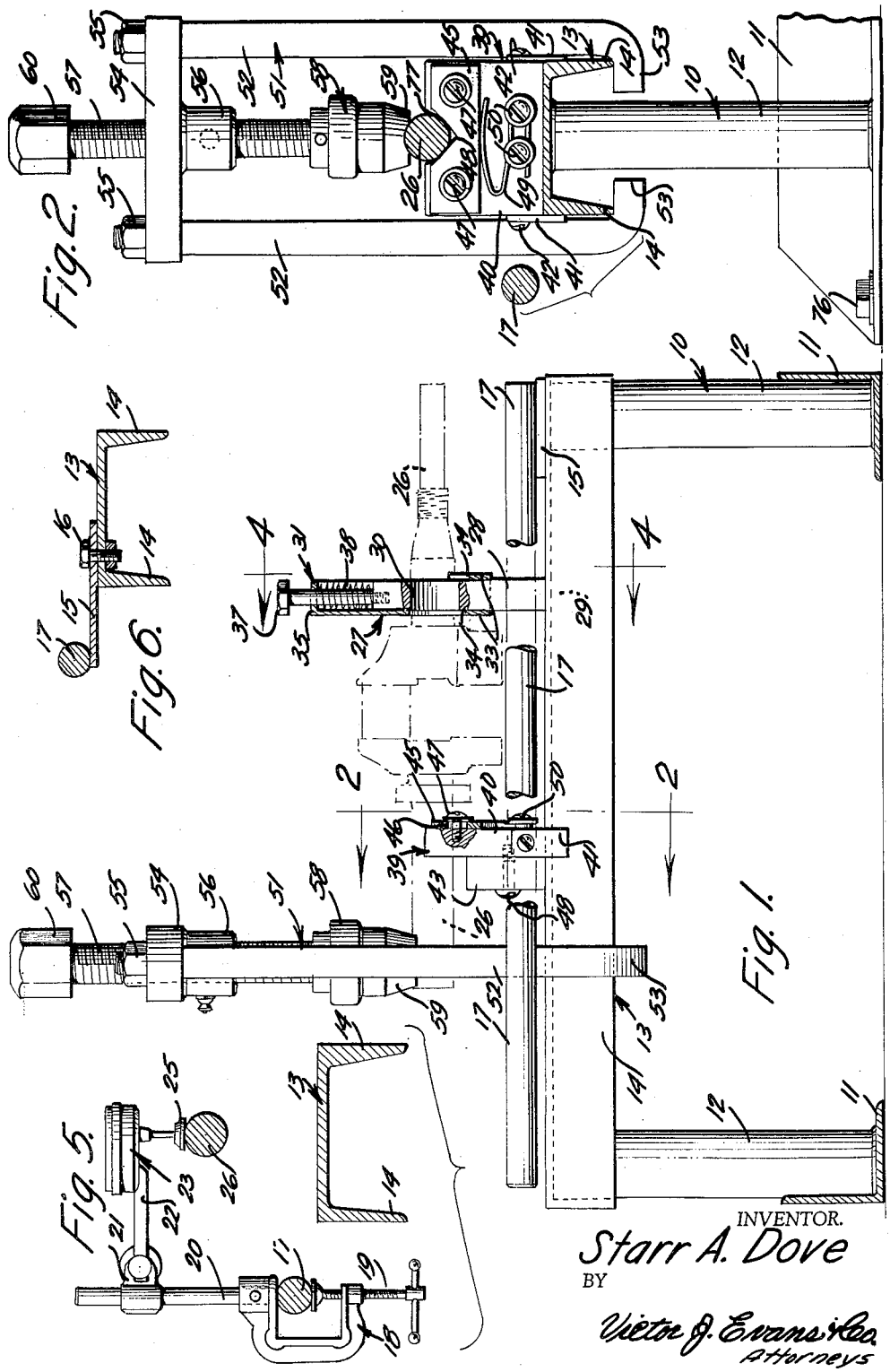

3,103,963
SHAFT STRAIGHTENING DEVICE
Starr A. Dove, Box 37, Skiatook, Okla.
Filed July 29, 1960, Ser. No. 46,208
1 Claim. (Cl. 153—32)

This invention relates to a shaft straightening device, and more particularly to a device for use in straightening crank shafts.

The object of the invention is to provide a device which will permit crank shafts such as lawn mower crank shafts to be accurately and conveniently straightened, and wherein in one form of the invention the crank shaft is adapted to be removed from the lawn mower when the crank shaft is being straightened, while in a different form of the invention or alternative arrangement, the crank shaft can be straightened without the necessity of removing the crank shaft from the lawn mower casing or housing.

Another object of the invention is to provide a crank shaft straightening device which is adapted to be manually actuated so that bent crank shafts can be readily straightened whereby the crank shafts can then be used again without the necessity of replacing the crank shaft which has been bent, and wherein according to the present invention an indicator is provided so that the user or operator can readily and accurately determine or ascertain when the crank shaft has been returned to its true straightened position.

A further object of the invention is to provide a shaft straightening device which is rugged in construction and fool-proof in operation and which is economical to manufacture and efficient to use and which is readily actuated by the operator or user of the device.

These and other objects of the invention will become apparent from a reading of the following specification and claims, taken with the accompanying drawings, wherein like parts are referred to and indicated by like reference characters and wherein:

FIGURE 1 is an elevational view of the shaft straightening device of the present invention, and with parts broken away and in section.

FIGURE 2 is a sectional view taken on the line 2—2 of FIGURE 1.

FIGURE 3 is a plan view of the shaft straightening device of the present invention.

FIGURE 4 is a sectional view taken on the line 4—4 of FIGURE 1.

FIGURE 5 is a sectional view taken on the line 5—5 of FIGURE 3.

FIGURE 6 is a sectional view taken on the line 6—6 of FIGURE 3.

FIGURE 7 is a fragmentary plan view illustrating a modification, and

FIGURE 8 is a sectional view taken through the modification of FIGURE 7.

Referring in detail to the drawings, and more particularly to FIGURES 1 through 6 of the drawings, the numeral 10 indicates a base which may comprise a pair of spaced parallel horizontally disposed bars 11, FIGURE 1, and extending upwardly from the bars 11 are spaced parallel vertically disposed legs 12, and the legs 12 may be secured to the bars 11 in any suitable manner, as for example, by welding. The numeral 13 indicates a horizontally disposed bed which is suitably secured as by welding to the upper ends of the legs 12, and the bed 13 is provided with depending flanges 14, FIGURE 4.

The numeral 15 indicates a plate which is pivotally connected to one end of the bed 13 as for example by means of a pin or bolt 16, FIGURE 3, and a rod 17 has one end portion secured as by welding to the plate 15, there being a clamp 18 mounted on the rod 17, FIGURE 5, and a pressure screw 19 is operatively connected to the clamp 18 for maintaining the clamp connected to the rod 17. The numeral 20 indicates a post which extends upwardly from the clamp 18, and a bracket 21 is mounted on the post 20, there being an arm 22 extending laterally from the bracket 21, and the arm 22 serves as a support for an indicator 23, and the indicator 23 may be provided with a movable pointer or hand such as the hand 24, FIGURE 3. The numeral 25 indicates a pressure element which depends from the indicator 23, and the pressure element 25 is adapted to engage the shaft such as the crank shaft 26 which is being straightened, and this crank shaft may be of the type which is used in power lawn mowers, and when using the device of FIGURES 1 through 6, the crank shaft 26 is adapted to be removed or disconnected from the lawn mower before it is straightened. However, as later described in this application in FIGURES 7 and 8, there is illustrated an arrangement wherein it is not necessary to remove the crank shaft from the lawn mower in order to straighten the crank shaft.

There is also provided a shaft rear support unit which is indicated generally by the numeral 27, and the support unit 27 comprises a block 28 which has its lower end secured to the bed 13 as for example by means of bolts or screws 29, FIGURE 4. The block 28 is provided with an opening 30 therein for the projection therethrough of the shaft 26 being straightened, and the numeral 31 indicates a frame which is adjustably or movably mounted on the block 28, and as shown in FIGURE 4 for example, the frame 31 includes spaced parallel vertically disposed side portions 32, and there is provided spaced parallel horizontally disposed connecting portions 33 which extend between the lower end of the side portions 32 and which are secured thereto or formed integral therewith, and the connecting portions 33 are provided with aligned opposed V-shaped grooves or notches 34 for receiving therein a portion of the shaft 26 which is being straightened, and the frame 31 further includes a top portion 35 which has an aperture 36 therein, and a screw element 37 extends through the aperture 36 and the lower end of the screw element 37 is connected to the top of the block 28, there being a coil spring 38 circumposed on the screw element 37, and the coil spring 38 is interposed between the top portion 35 and the upper ends of the block 28.

The numeral 39 indicates an anvil which includes a body member 40 that rests on the bed 13, and spaced parallel ears 41 are connected to the body member 40 as for example by means of screws 42, and the ears 41 depend from the lower portions of the body member 40 and are arranged contiguous to the outer surface of the flanges 14, as for example as shown in FIGURE 2. A magnet 43 is suitably affixed to the body member 40 as for example by means of a screw or bolt 44, and the numeral 45 indicates a test element or block which is adjustably connected to the body member 40. The test element 45 is provided with enlarged openings or slots 46, and screws 47 extend through these openings 46 and into engagement with the body member 40. This construction permits the test element 45 to slide or move up and down relative to the body member 40, and a V-shaped groove 48 in the test element 45 receives therein or engages a portion of the shaft 26 being straightened. The numeral 49 indicates a spring member which engages the lower edge of the test element 45 for normally biasing or urging the test element 45 upwardly and the lower portion of the spring member 49 may be anchored to the body member 40 as at 50.

As shown in FIGURE 2 for example, there is provided a press assembly which is indicated by the numeral 51, and the press assembly 51 comprises a pair of spaced apart bars 52 where each have inwardly directed opposed transverse lugs 53 on ends thereof, and a cross piece 54 extends between the other ends of the bars 52, and the cross piece 54 may be connected to the bars 52 as at 55. A bearing 56 is suitably affixed to the cross piece 54, and the numeral 57 indicates a screw member which extends through the cross piece 54 and through the bearing 56, and a head 60 is arranged on one end of the screw member 57, while the other end of the screw member is provided with a thrust bearing 58, and a pressure member 59 is arranged contiguous to the thrust bearing 58, the pressure member 59 adapted to engage the shaft 26 which is being straightened, as for example as shown in the drawings.

Referring now to FIGURES 7 and 8 of the drawings, there is illustrated a modification wherein the numeral 61 indicates a ring which is adapted to be arranged contiguous to a housing such as the housing 62 which may be part of a conventional power lawn mower, and with the arrangement of FIGURES 7 and 8 it is not necessary to remove the crank shaft such as the crank shaft 26 from the lawn mower housing 62. Thus, when using the parts in the position of FIGURES 7 and 8, it is only necessary to turn the lawn mower upside down and remove the cutting blade from the shaft 26 and then attach the ring 61 to the adjacent or bottom portion of the lawn mower housing 62. Thus, the ring 61 is provided with a plurality of spaced apart openings 63 whereby suitable fasteners such as the bolts 64 can be extended through these openings 63 and through suitable openings in the lawn mower housing or casing 62, and nuts 65 can be mounted on the bolts 64 so as to maintain the ring 61 connected to the housing 62. Spaced apart shoulders 66 are secured as by welding to the ring 61 or formed integral therewith, and the numeral 67 indicates a support member which is secured as by welding to the shoulders 66. The support member 67 includes a wall member 68 which is provided with a cutout or opening 69 therein, and the support member 67 further includes side sections 70 and a top section 71. The numeral 20' indicates a post which is suitably connected to the top section 71, and the post 20' is adapted to have an indicator such as the indicator 23 suitably connected thereto so that the operator or user can readily and accurately ascertain when the shaft 26 has been straightened the proper amount.

A cross element 72 extends between the side sections 70 and is connected thereto, and the numeral 73 indicates a screw which is adjustably connected to the cross element 72. The inner end of the screw 73 is arranged in engagement with the movable end anvil element 74, and the anvil element 74 is adjustably or movably mounted in the cutout 69 in the wall member 68. The anvil element 74 is provided with an opening 75 for the projection therethrough of the shaft 26. A press assembly 51 is adapted to be used in conjunction with the support member 67, and the press assembly 51 has the same construction as previously described.

The bars 11 may be fastened to a work bench or the like as for example by means of fasteners or bolts 76.

As shown in the drawings, the member 40 is provided with a V-shaped groove 77 that registers with or is aligned with the groove 48 in the test element 45.

From the foregoing, it is apparent that there has been provided a device which is especially suitable for straightening shafts such as chank shafts but it is to be understood that other types of cylindrical members or rods or shafts can be straightened therein besides crank shafts. When using the device of FIGURES 1 through 6 to straighten a crank shaft such as the crank shaft 26 which may be a crank shaft of a lawn mower or the like, the crank shaft 26 is disconnected or removed from the lawn mower and then arranged as shown in the drawings, and it will be seen that a portion of the shaft 26 extends through the opening 30 in the support unit 27, and another portion of the shaft engages the grooves 48 and 77 in the anvil 39, and the end of the shaft 26 is engaged by the pressure member 59 of the press assembly 51 so that by manually rotating the shaft 26, and tightening the screw member 57, the member 59 will apply or exert pressure on the bent portion or end of the shaft 26 in order to straighten the shaft. In order to ascertain or determine when the shaft is properly straightened, the indicator 23 is arranged as shown in FIGURE 5 for example, and the pressure element 25 which depends from the indicator 23 engages the shaft 26 so that by observing the pointer 24 the operator can readily determine when the shaft is true. When the indicator is not being used, the entire indicator mounting can be swung out of the way since the clamp 18 is affixed to the rod 17, and the rod 17 is secured to the plate 15, and in view of the fact that the plate 15 is pivotally connected as at 16 to the bed 13, it will be seen that when the indicator is not needed or when it is not being used, the rod 17 can be moved or swung from the solid line position of FIGURE 3 to the broken line of FIGURE 3 so that the indicator will be out of the way.

With further regard to the shaft rear support unit 27, it will be seen that the frame 31 is adjustably or slidably connected to the block 28, and the spring 38 serves to normally urge or bias the frame 31 upwardly, and since the frame 31 includes the lower portions 33 which have the V-shaped grooves 34 therein, it will be seen that the shaft 26 which projects through the opening 30 in the block 28 will be engaged by the V-shaped grooves 34.

The anvil 39 can be moved to different positions on the bed 13 as desired, and the magnet 43 is suitably affixed to the body member 40 of the anvil 39, and the magnet 43 co-acts with the bed 13 to maintain the anvil 39 immobile in its various adjusted positions. In addition, the anvil 39 includes the body member 40 which has the depending ears 41 and these ears 41 engage the sides of the bed 13, as for example as shown in FIGURES 1 and 2 so that these ears function as guide members to help prevent the anvil from moving out of its proper position on the bed. The test block 45 of the anvil is provided with a V-shaped groove 48 that is in alignment with a V-shaped groove 77 in the body member 40, and these grooves 48 and 77 snugly receive therein a portion of the shaft 26 being straightned. The enlarged openings or slots 46 in the test element 45 permit the spring member 49 to automatically urge or bias the test element 45 upwardly, as for example as shown in FIGURE 2.

The screw member 57 may be tightened in any suitable manner, and as the screw member 57 is tightened or rotated in the bearing 56, the pressure member 59 will bear against the shaft 26 in order to remove bends or the like from the shaft. The press assembly 51 is movably mounted on the bed 13 so that the press assembly 51 can be located at different positions on the bed as desired, and the bars 52 of the press assembly 51 include the lugs 53 which engage beneath the flanges 14 to help hold the press assembly steady on the bed 13.

In the modification of FIGURES 7 and 8, it is not necessary to remove the crank shaft from the lawn mower as is the case with the device of FIGURES 1 through 6, since in FIGURES 7 and 8 it is only necessary to disconnect the usual cutting blade from the shaft 26 and then turn the lawn mower upside down and then fasten the ring 61 to the lawn mower housing 62 as for example by means of a bolt 64 and nut 65. The crank shaft 26 which is to be straightened is arranged so that it projects through the opening 75 in the movable anvil element 74, and the press assembly 51 is of the same construction as previously described. However, in FIGURES 7 and 8 the press assembly 51 has its lugs 53 engaging an end of the support member 67. Thus, by properly turning or rotating the screw 73, the anvil 74 can be moved back and forth in the cut-out 69 of the wall member 68, and this is adapted to co-act with the pressure member 59 which is moved or properly positioned by rotation of the screw member 57 so that a crank shaft such as the bent crank shaft 26 can be readily and conveniently straightened. The post 20' is adapted to be suitably connected to the top section 71 of the support member 67, and suitable members are adapted to be used for connecting an indicator such as the indicator 23 to the post 20' so that this indicator can be used in the same manner as previously described.

After a shaft such as the shaft 26 has been straightened, the ring 61 is disconnected from the lawn mower housing 62 by loosening the bolts 64 and nuts 65 and the press assembly 51 and ring assembly are disengaged from the shaft 26, and then the cutting blade is connected to the shaft 26 in the usual manner and the lawn mower is turned right side up so that the lawn mower or other piece of equipment can be used in the usual manner.

The parts can be made of any suitable material and in different shapes or sizes.

In FIGURE 3 the gauge or indicator 23 is shown in position for reading the pointer 24. The mechanism of the indicator 23 may be of conventional construction, but the particular mounting employed herein is believed to be novel and unique. The member 58 may include ball bearings therein so that as the screw member 57 is turned as for example by engaging a wrench or the like with the head 60, the member 59 will apply pressure to the shaft 26 which is being straightened. In FIGURES 1 through 6 the device is adapted to be used for straightening a free shaft, while in FIGURES 7 and 8 the shaft need not be disconnected from the lawn mower.

The spring member 49 serves to lift the element 45 until the shaft 26 rests in the V-shaped notch 48 and is slightly above the bottom of the round in the anvil. The ears 41 serve as guide members for the anvil 39.

The openings 63 may be drilled in the ring 61 so that the shaft straightening device can be bolted to a crank case such as the crank case 62. The post 20' is adapted to be used for mounting a dial test indicator such as the indicator 23.

Thus, it will be seen that there has been provided a means for straightening a crank shaft and in one instance the crank shaft can be straightened while connected to the motor, or if desired the crank shaft can be removed and straightened. In addition, it is not necessary to remove the shaft from the motor in order to test the shaft to determine whether or not the shaft is straight. As pressure is applied to the screw member 57 to straighten the shaft, the element 45 will move downwardly against the pressure of the spring 49 so as to permit the shaft to rest on the straightening anvil member 40. The dial indicator 23 is used to check the shaft for position as for example to determine where to apply pressure and this indicator is also used for testing the straightness and is adapted to be used as a gauge to apply the right amount of pressure.

The arrangement of FIGURES 7 and 8 is adapted to be used for straightening a shaft in the motor without removing the motor from the mower and the assembly of FIGURES 7 and 8 has the mounting post 20' for an indicator to test for straightness and location for pressure. The anvil block or element 74 is adjusted by the screw 73 and this anvil element 74 serves to take approximately 50% of the pressure off of the motor base and serves to hold the shaft 26 steady when making tests for straightness. The device of FIGURES 7 and 8 is adjustable so that full leverage is insured for long or short shafts. The magnet 43 of the anvil 39 serves to hold the anvil steady on the bed plate 13 for accurate testing when the shaft is turned, and the anvil can be adjusted on the bed plate for any length of shaft. The indicator support rod 17 swings back out of the way when the indicator is not in use.

The spring 49 serves to hold the element 45 in contact with the shaft for testing when pressure is applied by the member 59 to the shaft to straighten the shaft, and the element 45 moves down to let the shaft 26 come in contact with the grooves 77 in the anvil body member 40.

With further regard to the support unit 27, the frame 31 slides up and down on the block 28, and due to the provision of the spring 38, the V-shaped grooves 34 in the portions 33 will be held in contact or in engagement with the shaft 26, as shown in FIGURE 4. The element 37 functions as a guide for the adjustable or movable frame 31.

To insert the shaft, the frame 31 is pushed downwardly and then the shaft 26 is inserted through the hole or opening 30, and then the pressure on the frame 31 is released so that the shaft will be held between the grooves 34 and the opening 30, and the spring 38 provides sufficient pressure to keep the shaft from accidentally turning when straightening the shaft. The support unit 27 also serves to support the shaft when rotating the same for testing.

An important feature of the present invention is that the shaft does not have to be removed to straighten or test the same, as shown in FIGURES 7 and 8, and the shaft can be straightened efficiently and accurately and conveniently.

Minor changes in shape, size and rearrangement of details coming within the field of invention claimed may be resorted to in actual practice, if desired.

What is claimed is:

In a device for straightening a bent shaft including a press assembly having a pair of spaced apart bars each having an inwardly directed transverse lug on one end thereof, a crosspiece connecting the other ends of said bars together, and a screw member threadably extending through said crosspiece, said screw member having a head on one end and a pressure member on the other end, a ring adapted to be secured to a housing about a shaft to be straightened, a support member fixedly secured to said ring, said support member including spaced side sections, and a wall member having an opening therein, a cross element extending between and secured to said side sections adjacent one end of said support member, a screw threadably connected to said cross element, an anvil element disposed in the opening in said wall member and engaged by one end of said screw, said anvil element being provided with an opening to receive said shaft with the pressure member of the press assembly screw member bearing against said shaft and with the lugs of the press assembly bars engaging said one end of said support member.

References Cited in the file of this patent
UNITED STATES PATENTS

| | | |
|---|---|---|
| 1,450,373 | Jones | Apr. 3, 1923 |
| 1,461,463 | Staley | July 10, 1923 |
| 1,605,310 | Weaver | Nov. 2, 1926 |
| 2,278,353 | Johnson | Mar. 31, 1942 |
| 2,310,151 | Pope | Feb. 2, 1943 |

FOREIGN PATENTS

| | | |
|---|---|---|
| 466,325 | Germany | Oct. 4, 1928 |